US010339411B1

(12) United States Patent
Hua et al.

(10) Patent No.: US 10,339,411 B1
(45) Date of Patent: Jul. 2, 2019

(54) SYSTEM TO REPRESENT THREE-DIMENSIONAL OBJECTS

(71) Applicant: AMAZON TECHNOLOGIES, INC., Seattle, WA (US)

(72) Inventors: Gang Hua, Sammamish, WA (US); Li Guan, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/868,205

(22) Filed: Sep. 28, 2015

(51) Int. Cl.
*G06K 9/00* (2006.01)
*G06K 9/46* (2006.01)
*G06T 7/00* (2017.01)
*G06T 17/20* (2006.01)
*G06F 16/532* (2019.01)

(52) U.S. Cl.
CPC ......... *G06K 9/4671* (2013.01); *G06F 16/532* (2019.01); *G06K 9/00214* (2013.01); *G06T 7/0071* (2013.01); *G06T 7/0075* (2013.01); *G06T 17/20* (2013.01); *G06T 2207/10021* (2013.01); *G06T 2207/10024* (2013.01); *G06T 2207/10028* (2013.01); *G06T 2207/30244* (2013.01)

(58) Field of Classification Search
CPC .............. G06K 9/4671; G06K 9/00214; G06F 17/30277; G06T 7/0075; G06T 17/20; G06T 7/0071; G06T 2207/30244; G06T 2207/10021; G06T 2207/10024; G06T 2207/10028
USPC ....................................................... 382/190
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,620,095 | B2 * | 12/2013 | Sinha ............... G06K 9/469 345/156 |
| 8,630,924 | B2 | 1/2014 | Groenevelt et al. |
| 9,235,928 | B2 | 1/2016 | Medioni et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — John B Strege
(74) *Attorney, Agent, or Firm* — Lindauer Law, PLLC

(57) ABSTRACT

A three-dimensional (3D) object may be represented by object data. The object data includes probability distributions that describe particular features on the 3D object. A probability distribution represents the value of local descriptors for the same feature as obtained from a plurality of images at different camera poses relative to the 3D object. A query image may be processed to determine features, and the query local descriptors of those features may be used to test against previously stored probability distributions. A combination of probability distributions that show a high probability of corresponding to the query local descriptors may be used to identify the 3D object appearing in the query image.

21 Claims, 9 Drawing Sheets

(56) References Cited

U.S. PATENT DOCUMENTS

| | | | | |
|---|---|---|---|---|
| 2004/0051783 | A1* | 3/2004 | Chellappa | H04N 13/026 348/46 |
| 2005/0276443 | A1* | 12/2005 | Slamani | G06K 9/00208 382/103 |
| 2006/0083430 | A1* | 4/2006 | Neumann | G06K 9/00087 382/228 |
| 2010/0303354 | A1* | 12/2010 | Reznik | G06K 9/4642 382/168 |
| 2011/0011936 | A1 | 1/2011 | Morandi et al. | |
| 2012/0093408 | A1* | 4/2012 | Tang | G06K 9/4642 382/171 |
| 2012/0177294 | A1* | 7/2012 | Ke | G06F 17/30256 382/197 |
| 2012/0284132 | A1 | 11/2012 | Kim et al. | |
| 2013/0101226 | A1* | 4/2013 | Tang | G06K 9/4647 382/201 |
| 2013/0284806 | A1 | 10/2013 | Margalit | |
| 2014/0233800 | A1* | 8/2014 | Kis | G06T 7/2033 382/103 |
| 2014/0328543 | A1* | 11/2014 | Iwamoto | G06K 9/4604 382/201 |
| 2015/0161476 | A1* | 6/2015 | Kurz | G06K 9/4671 382/190 |

OTHER PUBLICATIONS

Bay, et al., "SURF: Speeded Up Robust Features", ETH Zurich, pp. 1-14, [retrieved on Sep. 28, 2015]. Retrieved from the Internet: <URL: http://www.vision/ee.ethz.ch/~surf/eccv06/pdf>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction in BodyCom Technology", AN1391, DS01391A, Microchip Technology, Inc., May 2, 2011.

Tola, et al., "A Fast Local Descriptor for Dense Matching", Computer Vision Laboratory, Ecole Polytechnique Federale de Lausanne (EPFL) [retrieved on Sep. 28, 2015]. Retrieved from Internet: <URL: http://infoscience.epfl.ch/record/126372/files/tolaLF_cvpr08.pdf>.

Winder, et al., "Picking the best DAISY", [retrieved on Sep. 28, 2015]. Retrieved from Internet: <URL: http://www.cs.ubc.ca/~mbrown/papers/cvpr2009.pdf>.

* cited by examiner

SYSTEM TO REPRESENT THREE-DIMENSIONAL OBJECTS

BACKGROUND

Information about three-dimensional (3D) objects may be used in a variety of situations. For example, an image acquired by a camera may be processed and the image may be analyzed to identify the object in the image.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
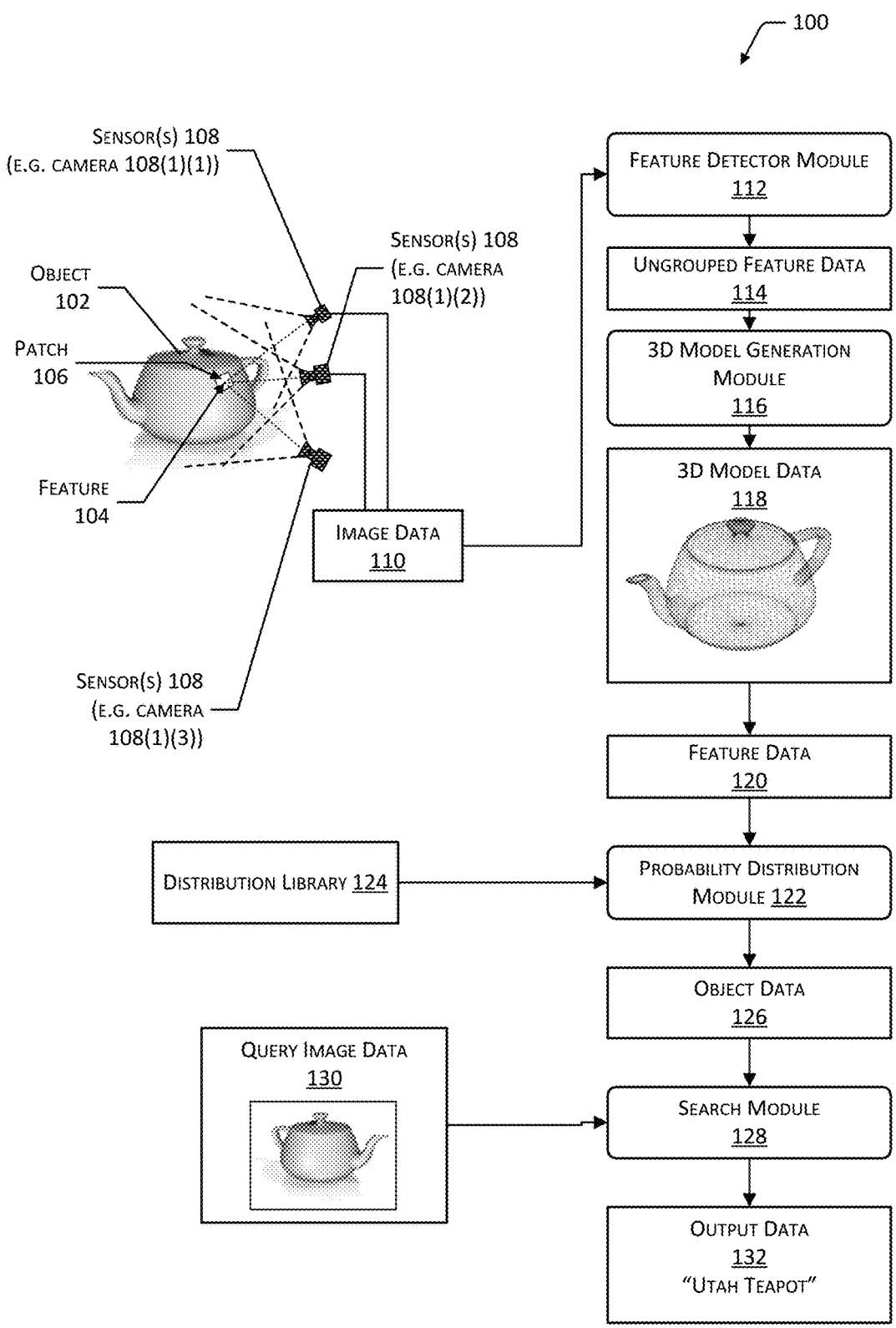
FIG. 1 illustrates a data processing system to generate object data indicative of a 3D object, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Identification of three-dimensional (3D) objects may utilize previously stored information about 3D objects. For example, a database may store information that is representative of one or more characteristics of the object such as size, shape, color, shading, and so forth. Sensors such as cameras, depth sensors, and so forth, may be used to acquire sensor data about real-world objects. This sensor data may be processed to identify an object.

Traditional systems to store information about 3D objects have typically resulted in relatively large sets of data for each object. For example, the information may comprise large sets of images, each acquired from a different camera pose between the camera and the object. Searches of these large sets of data are resource intensive, utilizing computational resources such as processor time to perform computations, memory to store the relatively large sets of data or portions thereof, input/output operations to read and write those sets of data, and so forth.

Described in this application are techniques and data structures to store information representative of a 3D object. Also described are techniques for searching that information to identify an object, determine a pose of the object relative to a sensor, and so forth.

In one implementation, images of the object may be acquired, each obtained from a different view angle or camera pose relative to the object. For example, the object may be placed on a turntable and rotated while cameras obtain a plurality of images at different times.

The plurality of images may be processed to generate ungrouped feature data that describes features which appear in the images. For example, a maximally stable extremal regions (MSER) algorithm, a Harris affine region algorithm, an oriented FAST and rotated BRIEF (ORB) algorithm, a DAISY algorithm, a difference of Gaussian blob detector algorithm, a Laplacian of Gaussian blob detector algorithm, or a determinant of Hessian blob algorithm may be used to determine particular features of an object. Each feature may be assigned a feature identifier.

A 3D model of a 3D object (object) may be generated using the ungrouped feature data. For example, structure-from-motion (SFM) techniques may be used to determine the ungrouped feature data and generate a 3D model. The 3D model may comprise a mesh model that describes a surface topology of the object, color, shading, and so forth. In another example, the object may be scanned using a depth sensor to determine the mesh model.

In some implementations, the 3D model may be used to associate a feature that has been determined within a particular image to the same feature as it appears in another image. For example, a particular feature of a particular portion of a teapot may be detected in several of the images that are acquired at different camera poses. The 3D model may be used to determine the same feature appearing in different images. For example, a two-dimensional (2D) projection of the 3D model for a known camera pose may be used to determine the displacement of the particular feature as it appears from one image to the next, resulting from the rotation on the turntable.

Local descriptor values may be determined for the same feature as it appears in the several images. For example, local descriptor values may be calculated for the same feature identifier appearing in several of the images acquired from the turntable. In some implementations, the local descriptor values may be determined using the same algorithm as the feature determination. For example, the local descriptor value may comprise a value produced by the scale-invariant feature transform (SIFT) algorithm that was used to determine the presence of the particular feature in the image.

The local descriptor values may comprise information such as scalars, vectors, and so forth. The local descriptor values are indicative of one or more attributes of the particular portion of the object as presented in the images. For example, the local descriptor values may be descriptive of a particular gradient of the feature as it appears in the image.

A probability distribution may be determined that fits the local descriptor values of that same feature which appears across the several images. In some implementations, the probability distribution may indicate a probability of a particular local descriptor value given a particular camera pose. For example, the local descriptor values for the same feature appearing across several images, each representative of a different camera pose, may exhibit a Gaussian distribution having a mean of 47 and a standard deviation of 3. As a result, the set of those local descriptors associated with the feature may be represented as the probability distribution.

Object data may be stored that is representative of the 3D object. The object data may include information indicative of the particular 3D object, the feature identifiers for the features of that particular object, and data indicative of the probability distribution associated with the feature identifier of that particular object.

The feature identifier refers to a particular one of the features that has been determined to be present in image data obtained of the 3D object. The image data includes images obtained from several different poses, such as taken while the 3D object is rotated on a turntable. Local descriptor values are determined for the particular feature as present in the different poses. For example, each local descriptor value may be indicative of gradient or vector value associated with that feature in a particular image taken at a particular pose. A probability distribution may be fitted to the local descriptor values for that particular one of the features as seen in several different poses. The probability distribution and corresponding distribution parameters may then be stored in the object data, instead of storing the individual local descriptor values. For example, the local descriptor values for a particular feature may be described as a Gaussian probability distribution. The object data for a particular object is relatively compact compared to prior mechanisms for storing a 3D representation of an object. The object data may be efficiently utilized for other processing. Furthermore, because of the nature of the distribution and the different camera poses represented by the distribution, subsequent retrieval may be faster and more accurate compared to traditional techniques.

The object data may be searched using a query image. The query image may comprise a single 2D image of an object, such as acquired from a camera. In one implementation, the query image may be processed to determine one or more of the features present in the query image. The local descriptor value for each of the features may be determined. For example, where the object data stores data about features identified using the SIFT algorithm, the query image may be processed using the SIFT algorithm to determine the features and the local descriptor values for those features.

The distribution data in the object data may be accessed. The distribution data may be used to determine a probability that the local descriptor values for the features in the query image correspond to the previously stored probability distribution. For example, the first local descriptor value may be used to determine the probability that the first local descriptor value is associated with a particular feature. Probabilities for the first local descriptor value across a plurality of the probability distributions that are available may be determined. The resulting probabilities may be used to rank the probability distributions. The highest ranked probability distribution having the highest probability may be deemed to be the probability distribution associated with that feature. The highest ranked probability distribution is associated with a particular object identifier.

A similar process may take place with at least a portion of the features determined in the query image. As a result, a plurality of highest ranked probability distributions may be determined, each associated with a particular object identifier. In some implementations, the object identifier associated with the largest number of probability distributions may be deemed to be indicative of the object appearing in the query image. Output data may then be generated that indicates the object identifier.

In other implementations, other output data may be provided instead of, or in addition to, the object identifier. For example, the pose of the object relative to the sensor may be determined. In another implementation, the entropy of a particular distribution may be measured and used to determine relevant portions of the query image. The lower the entropy detected, the more salient the feature is. For example, the entropy of the features on the surface of the 3D model may be determined, and those having an entropy value below a threshold amount may be disregarded from consideration during identification.

By generating and utilizing the object data, various tasks that utilize 3D data may be improved. For example, the object data about objects appearing in a facility such as items for sale, totes, users, automated devices, and other objects in the facility may be stored using less memory space. Additionally, queries to determine an object present within a query image acquired by a camera in the facility may be more quickly executed. As a result, overall operation of the facility may be improved.

Illustrative System

FIG. 1 illustrates a data processing system 100. An object 102 is depicted. The object 102 comprises a tangible thing that fills some volume in 3D space. For example, the object 102 may include an item such as the teapot depicted here, a user, a tote, a robot, a tool, and so forth. The object 102 includes one or more features 104. The feature 104 may comprise some aspect of the object 102 that is perceivable or detectable. The feature 104 may have some physicality, such as the handle of the teapot, a protrusion, declivity, and so forth. In some situations, the feature 104 may be detectable as an interaction of the physicality of the object 102 with light or other energy. For example, the feature 104 may cast a shadow when illuminated from a particular direction. In some implementations, the feature 104 may be a particular point on the surface of the object 102. In other implementations, the feature 104 may be a patch 106 on the surface of the object 102. The patch 106 may be defined by borders of a feature, by a predetermined metric, and so forth. For example, the patch 106 may be a portion in an image that measures 8×8 pixels, may comprise a triangular area described by an equilateral triangle 5 millimeters on a side, and so forth.

One or more sensors 108 may be used to acquire image data 110 about the object 102. For example, the sensors 108 may comprise cameras 108(1) that acquire grayscale or color images of the object 102. In the illustration depicted here, three cameras 108(1)(1), 108(1)(2), and 108(1)(3) gather the image data 110. Each of the cameras 108(1)(1)-108(1)(3) may have a different camera pose relative to the object 102. The camera pose may also be described as a view angle, point-of-view, and so forth.

The image data 110 comprises data indicative of an image acquired by the cameras 108(1). For example, the image data 110 may comprise data representative of a two-dimensional (2D) matrix of pixels, where each pixel represents information such as color values as measured by one or more elements on a detector.

A feature detector module 112 may utilize the image data 110 and the 3D model data 118 to determine ungrouped feature data 114. The feature detector module 112 may process the image data 110 to determine the presence of features in the data. For example, the feature detector module 112 may process at least a portion of the image data 110 using a MSER algorithm, a Harris affine region algorithm, an ORB algorithm, a DAISY algorithm, a difference of Gaussian blob detector algorithm, a Laplacian of Gaussian blob detector algorithm, a determinant of Hessian blob algorithm, and so forth. In some implementations, the ungrouped feature data 114 may include local descriptor values, such as described below.

The feature detector module 112 may assign a feature identifier to each detected feature 104. The feature identifier may serve to distinguish the data associated with one feature 104 from another during subsequent processing.

A 3D model generation module 116 may be used to generate 3D model data 118 using the ungrouped feature data 114. For example, the features 104 represented by the ungrouped feature data 114 may be used to generate a mesh model that describes at least a portion of the surface of the object 102. The 3D model generation module 116 may use various techniques to generate the 3D model data 118. For example, a relative motion between the object 102 and the sensors 108 may be imparted, such as a turntable that rotates the object 102. A SFM algorithm may be used to process the image data 110 that includes images acquired from several different camera poses. For example, the libmv library as promulgated by Andrew Chant, Daniel Waterworth, Darius Blaszyk, et al., the sfm_toolbox as promulgated by Vincent Rabaud, and so forth. In some implementations, camera pose for a particular pose may be known, such as a particular rotation of the turntable associated with a particular image.

In other implementations, the 3D model generation module 116 may use other sensor data instead of or in addition to the image data 110. For example, a depth sensor 108(2) may generate point cloud data of the object 102.

The feature detector module 112 may determine that a same feature of the object 102 appears across multiple images in the image data 110. In some implementations, this determination may use the 3D model data 118 to determine that a particular feature 104 in a first image of the image data 110 is the same feature 104 in a second image of the image data 110. For example, the same portion of the teapot may be visible in several images, with each image obtained from a different camera pose relative to the object 102. Continuing the example, given a known angular difference in camera pose between the first and second images, and assuming the object 102 is reasonably rigid, the same feature 104 may be identified in both images and associated across the first and second images.

The feature detector module 112 generates the feature data 120 for the respective features 104 of the object 102 as they appear across the plurality of images in the image data 110. The feature data 120 may include one or more of the feature identifier, an image number, pose data, and a local descriptor value. For example, assume the object 102 has a single feature 104, and image data 110 was obtained from 90 different camera poses. The feature data 120 may comprise the single feature identifier associated with the feature 104 and 90 local descriptor values, one from each pose.

The feature data 120 may be indicative of one or more characteristics of the feature 104. In some implementations, a first algorithm may detect the feature 104 while a second algorithm generates a local descriptor value about the feature 104. For example, the feature data 120 may be indicative of a gradient of the pixels in the patch 106 that encompasses at least a portion of the feature 104. In other implementations, the feature determination and the local descriptor value may be determined by the same algorithm. For example, the SIFT algorithm may produce local descriptor values in addition to identification of the features. The feature data 120 is discussed in more detail below with regard to FIG. 2.

The feature data 120 may be processed by a probability distribution module 122. The probability distribution module 122 determines a probability distribution that fits the local descriptor values for a particular feature 104 to within a threshold value. To facilitate operation of the probability distribution module 122, a distribution library 124 may be accessed. The distribution library 124 may describe different types of probability distributions. For example, the distribution library 124 may describe a Gaussian distribution, a binomial distribution, a Bernoulli distribution, and so forth. The distribution library 124 is discussed in more detail below with regard to FIG. 3. The type of probability distribution, in conjunction with distribution parameters may be used to characterize a particular probability distribution. For example, the probability distribution of the local descriptor values for a particular feature 104 may be determined to have a Gaussian distribution with a mean of 47 and a standard deviation of 3.

The probability distribution module 122 generates object data 126. The object data 126 may include information such as an object identifier indicative of a particular object 102, a feature identifier indicative of the particular feature 104 on the particular object 102, and probability distribution data indicative of the local descriptor values of that feature 104 across a plurality of image data 110. By storing a plurality of different feature identifiers and their associated probability distribution data, a particular object 102 may be characterized in three dimensions. The object data 126 is described in more detail below with regard to FIG. 3.

The object data 126 may be accessed by a search module 128 to identify an object 102. The search module 128 may access query image data 130. For example, a camera 108(1) in the facility may obtain the query image data 130 of an object 102. The search module 128 may use the feature detector module 112 to process the query image data 130 and determine a feature 104, or query feature. The local descriptor value for the feature 104 present in the query image data 130 may then be determined.

The search module 128 may determine a probability that the local descriptor value for the query feature 104 appears in the object data 126. For example, the local descriptor value may be tested against the probability distribution data in the object data 126 to find those probability distributions which have a high probability of including the local descriptor value for the query feature 104. These probability distributions may be ranked by the probability they correspond to the local descriptor value. The probability distribution having the highest rank may be associated with the query feature 104. The object identifier associated with the highest ranking probability distribution may be used to determine the object 102. The search module 128 may generate output data 132 indicative of this determination.

For example, the output data 132 may indicate that the query image data 130 depicts the object identified as the "Utah teapot".

The search module 128 may utilize a plurality of query features and their corresponding local descriptor values to generate the output data 132. For example, the feature data 120 may include local descriptor values for many features 104 present in the query image data 130. The search module 128 may determine the highest ranked probability distributions for each local descriptor value. The frequency of a particular object identifier within the highest ranked probability distributions may then be used to generate the output data 132. Continuing the example, the object identifier for the "Utah teapot" may be the most frequent, appearing in 972 of the 1271 highest ranked probability distributions. The output data 132 may thus indicate that the object 102 is the "Utah teapot".

Figure 2:
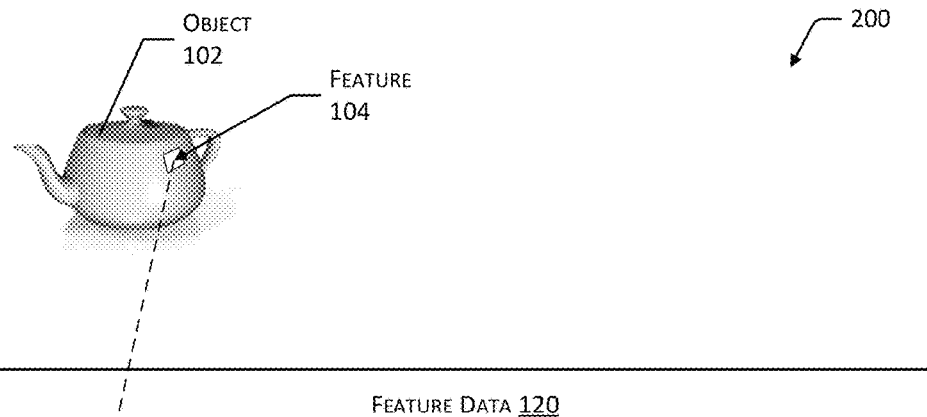
FIG. 2 illustrates feature data used to generate the object data, according to some implementations.

FIG. 2 illustrates an enlargement 200 of the feature data 120 used to generate the object data 126, according to some implementations. The feature data 120 may include one or more of a feature identifier 202, an image number 204, pose data 206, or a local descriptor value 208.

The feature identifier 202 may be assigned to a particular feature 104. For example, the feature identifier 202 may comprise a sequential number that is assigned to respective features 104 in order of their discovery by the feature detector module 112.

The image number 204 comprises information indicative of a particular image in the image data 110 that the feature 104 has been determined to be present within. For example, the image data 110 may comprise a plurality of sequential images acquired by the cameras 108(1) as the object 102 rotates on a turntable.

The pose data 206 provides information on the camera pose associated with the particular image. The camera pose provides information on the relative relationship between the object 102 and the camera 108(1). The camera pose may be described as a point-of-view, viewing angle, and so forth. Continuing the example, in this illustration, the pose data 206 indicates that a relative angle between the feature 104 and the camera 108(1) has increased by 5 degrees with each successive image, due to the rotation of the turntable. The pose data 206 may comprise information indicative of rotation, translation, and so forth. The pose data 206 may be relative to a particular reference point or origin that is external to the object 102 and the camera 108(1), or may be specified with respect to the object 102 or the camera 108(1).

The local descriptor value 208 may be generated by the feature detector module 112. In some implementations, the determination of the feature 104 and the generation of the local descriptor value 208 may occur during the same operation. For example, the local descriptor value 208 may be generated by the SIFT algorithm during determination of the features 104. The local descriptor values 208 may be representative of scalar, vector, matrix, decimal, discrete, or other values. For example, the local descriptor values 208 may be represented by floating point values. For illustrative purposes, and not by way of limitation, the local descriptor values 208 are depicted graphically in this figure as vector values. For example, the local descriptor values 208 may be indicative of a gradient determined within the patch 106 that encompasses the feature 104.

As the feature data 120 in FIG. 2 illustrates, the same feature 104 (as indicated by the same feature identifier 202) has been determined to be present in at least 12 images. Each of those 12 images has been obtained with a different camera pose. For that same feature 104, as the camera pose changes, the local descriptor value 208 for that feature 104 may have changed as well.

The feature data 120 may include additional feature identifiers 202. For example, the feature data 120 may include information about features 104(1), 104(2), . . . , 104(N). As used in this disclosure, letters in parenthesis such as "(N)" indicate an integer value greater than or equal to zero. For each of these features 104, the feature data 120 may include corresponding images obtained in different camera poses, their respective local descriptor values 208, and so forth. In some implementations, the feature data 120 may include other data as well. For example, the feature data 120 may include data about lighting conditions during acquisition of the image data 110.

The feature data 120 is depicted and described in a tabular data structure for ease of illustration and not necessarily as a limitation. For example, the feature data 120 may be stored as a linked list, tree, and so forth.

Figure 3:
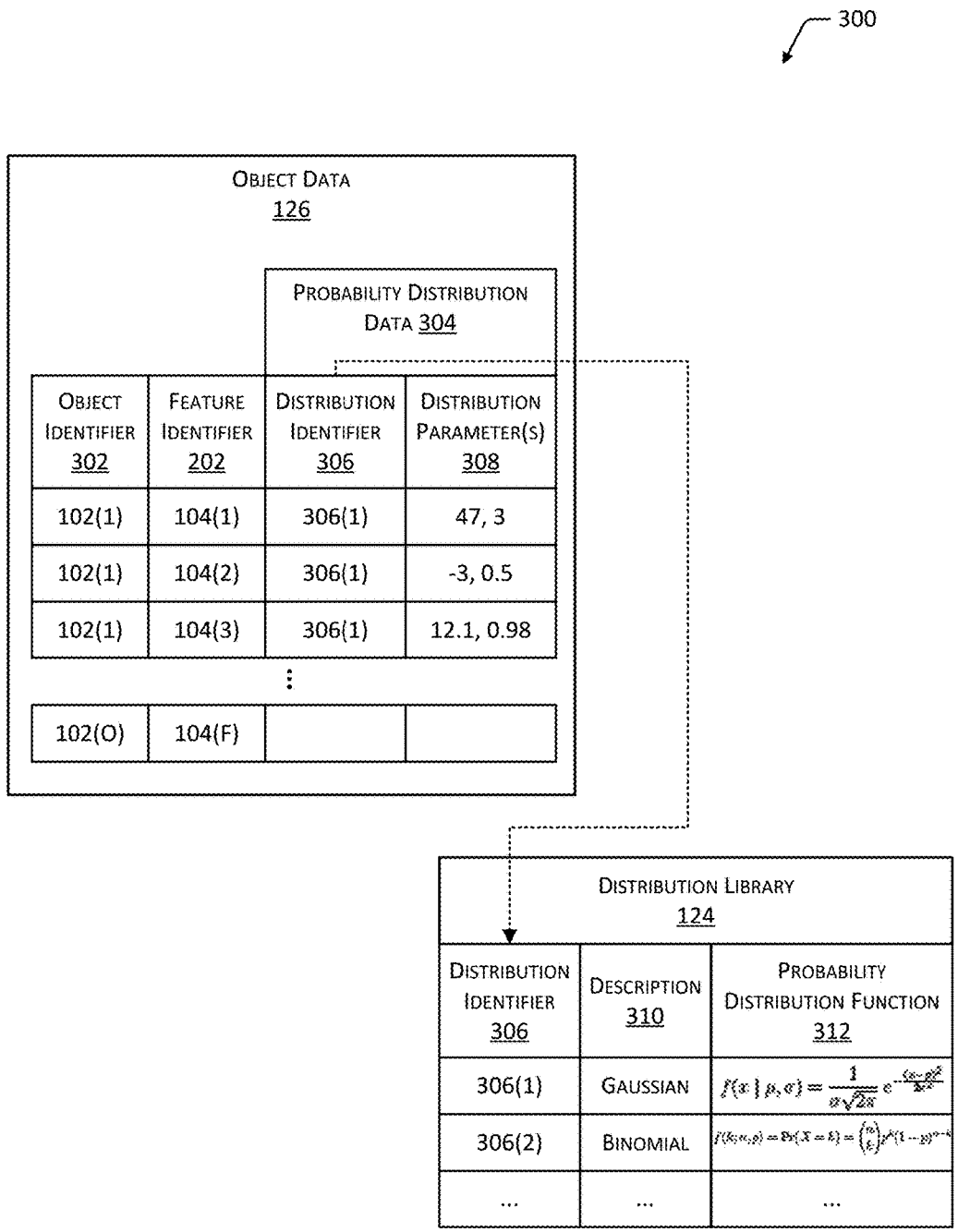
FIG. 3 illustrates object data that is representative of a 3D object, according to some implementations.

FIG. 3 illustrates an enlargement 300 of the object data 126 that is representative of a 3D object 102, according to some implementations. The object data 126 may include an object identifier 302, the feature identifier 202, and probability distribution data 304.

The object identifier 302 is data that is indicative of a particular object 102. For example, the "Utah teapot" depicted in FIG. 1 may be associated with the object identifier 302. As described above, the feature identifier 202 is indicative of a particular feature 104 of the object 102 specified by the object identifier 302.

Probability distribution data 304 may be associated with a particular combination of an object identifier 302 and feature identifier 202. The probability distribution data 304 comprises information indicative of a probability distribution that fits, to within a threshold value, a plurality of the local descriptor values 208 associated with the particular object identifier 302 and feature identifier 202.

The probability distribution data 304 may comprise a distribution identifier 306 and one or more distribution parameters 308. The distribution identifier 306 may refer to a particular distribution in the distribution library 124. For example, the distribution identifier 306(1) may refer to a Gaussian distribution while the distribution identifier 306(2) may refer to a Binomial distribution. The distribution library 124 may store the distribution identifier 306 and information associated with that distribution identifier 306, such as a description 310, a probability distribution function 312, and so forth. The probability distribution function 312 may be expressed as an equation, script, executable code, and so forth. The probability distribution function 312 may express one or more of: a Gaussian distribution, a binomial distribution, a Bernoulli distribution, a probability density function, and so forth.

The distribution parameters 308 specify one or more parameters of the particular probability distribution. For example, a Gaussian probability distribution may have distribution parameters 308 of a value of a mean and a value of a standard deviation.

By representing the local descriptor values 208 for a particular feature 104 as a probability function described by a distribution identifier 306 and distribution parameters 308, the amount of memory used to store the object data 126 is significantly reduced relative to the feature data 120. Furthermore, the object data 126 may be more quickly searched, as described below.

The object data 126, the distribution library 124, and other information in this disclosure are depicted and described in a tabular data structure for ease of illustration and not necessarily as a limitation. For example, the object data 126 may be stored as a k-dimensional tree, linked list, and so forth.

Illustrative Facility

Retailers, wholesalers, and other product distributors typically maintain an inventory of various items in a facility that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, it may be worthwhile to identify an object present in the facility or absent therefrom. This presence and other information, such as location, movement, condition, and so forth may be used for various purposes.

The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth. For example, an inventory management system may use information about the objects to determine a quantity of inventory on hand, determine an item that that has been picked by a user, and so forth.

Figure 4:
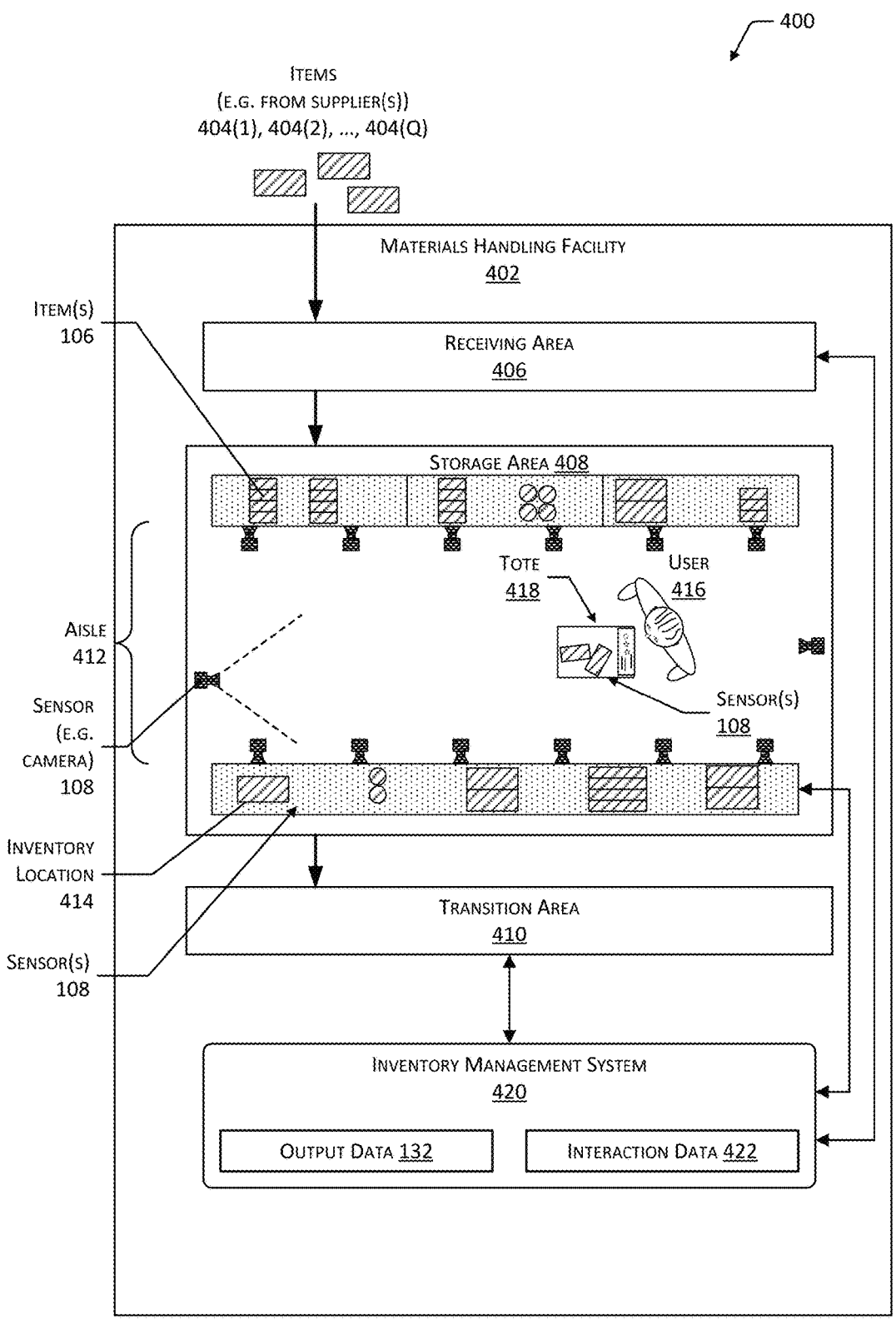
FIG. 4 is a block diagram illustrating a materials handling facility (facility) using the data processing system, according to some implementations.

FIG. 4 is a block diagram 400 illustrating a materials handling facility (facility) 402 using the data processing system 100, according to some implementations. The facility 402 comprises one or more physical structures or areas within which one or more items 404(1), 404(2), . . . , 404(Q) may be held. The items 404 comprise physical goods, such as books, pharmaceuticals, repair parts, electronic gear, and so forth.

The facility 402 may include one or more areas designated for different functions with regard to inventory handling. In this illustration, the facility 402 includes a receiving area 406, a storage area 408, and a transition area 410.

The receiving area 406 may be configured to accept items 404, such as from suppliers, for intake into the facility 402. For example, the receiving area 406 may include a loading dock at which trucks or other freight conveyances unload the items 404. In some implementations, during initial intake processing, receiving, and so forth, the data processing system 100 may be used to generate object data 126 for an item 404.

The storage area 408 is configured to store the items 404. The storage area 408 may be arranged in various physical configurations. In one implementation, the storage area 408 may include one or more aisles 412. The aisle 412 may be configured with, or defined by, inventory locations 414 on one or both sides of the aisle 412. The inventory locations 414 may include one or more of a shelf, a rack, a case, a cabinet, a bin, a floor location, or other suitable storage mechanisms for holding, supporting, or storing the items 404. The inventory locations 414 may be affixed to the floor or another portion of the structure of the facility 402. The inventory locations 414 may also be movable such that the arrangements of aisles 412 may be reconfigurable. In some implementations, the inventory locations 414 may be configured to move independently of an outside operator. For example, the inventory locations 414 may comprise a rack with a power source and a motor, operable by a computing device to allow the rack to move from one location within the facility 402 to another.

One or more users 416(1), 416(2), . . . , 416(U) and totes 418(1), 418(2), . . . , 418(T) or other material handling apparatus may move within the facility 402. For example, the user 416 may move about within the facility 402 to pick or place the items 404 in various inventory locations 414, placing them on the tote 418 for ease of transport. The tote 418 is configured to carry or otherwise transport one or more items 404. For example, the tote 418 may include a basket, cart, bag, bin, and so forth. In other implementations, other material handling apparatuses such as robots, forklifts, cranes, aerial drones, and so forth, may move about the facility 402 picking, placing, or otherwise moving the items 404. For example, a robot may pick an item 404 from a first inventory location 414(1) and move the item 404 to a second inventory location 414(2).

One or more sensors 108 may be configured to acquire information in the facility 402. The sensors 108 may include, but are not limited to, cameras 108(1), depth sensors 108(2), weight sensors 108(6), optical sensor arrays 108(13), proximity sensors 108(14), and so forth. The sensors 108 may be stationary or mobile, relative to the facility 402. For example, the inventory locations 414 may contain weight sensors 108(6) to acquire weight sensor data of items 404 stowed therein, cameras 108(1) to acquire images of picking or placement of items 404 on shelves, optical sensor arrays 108(13) to detect shadows of the user's 416 hands at the inventory locations 414, and so forth. In another example, the facility 402 may include cameras 108(1) to obtain images of the user 416 or other objects 102 in the facility 402. The sensors 108 are discussed in more detail below with regard to FIG. 5.

While the storage area 408 is depicted as having one or more aisles 412, inventory locations 414 storing the items 404, sensors 108, and so forth, it is understood that the receiving area 406, the transition area 410, or other areas of the facility 402 may be similarly equipped. Furthermore, the arrangement of the various areas within the facility 402 is depicted functionally rather than schematically. For example, in some implementations, multiple different receiving areas 406, storage areas 408, and transition areas 410 may be interspersed rather than segregated in the facility 402.

The facility 402 may include, or be coupled to, an inventory management system 420. The inventory management system 420 is configured to interact with users 416 or devices such as sensors 108, robots, material handling equipment, computing devices, and so forth, in one or more of the receiving area 406, the storage area 408, or the transition area 410.

During operation of the facility 402, the sensors 108 may be configured to provide sensor data, or information based on the sensor data, to the inventory management system 420. The sensor data may include image data 110, non-image data, weight sensor data obtained from weight sensors 108(6), and so forth.

The inventory management system 420 or other systems may use the sensor data to track the location of objects within the facility 402, movement of the objects 102, or provide other functionality. The objects 102 may include, but are not limited to, items 404, users 416, totes 418, and so forth. For example, a series of images acquired by the camera 108(1) may indicate removal by the user 416 of an item 404 from a particular location on the inventory location 414 and placement of the item 404 on or at least partially within the tote 418. The data processing system 100 may be used to identify the objects 102 appearing in query image data 130 obtained by the sensors 108 during operation.

The facility 402 may be configured to receive different kinds of items 404 from various suppliers and to store them until a customer orders or retrieves one or more of the items 404. A general flow of items 404 through the facility 402 is indicated by the arrows of FIG. 4. Specifically, as illustrated in this example, items 404 may be received from one or more suppliers, such as manufacturers, distributors, wholesalers, and so forth, at the receiving area 406. In various implementations, the items 404 may include merchandise, commodities, perishables, or any suitable type of item 404, depending on the nature of the enterprise that operates the facility 402.

Upon being received from a supplier at the receiving area 406, the items 404 may be prepared for storage in the storage area 408. For example, in some implementations, items 404 may be unpacked or otherwise rearranged. The inventory management system 420 may include one or more software applications executing on a computer system to provide inventory management functions. These inventory management functions may include maintaining information indicative of the type, quantity, condition, cost, location, weight, or any other suitable parameters with respect to the items 404. The items 404 may be stocked, managed, or dispensed in terms of countable units, individual units, or multiple units, such as packages, cartons, crates, pallets, or other suitable aggregations. Alternatively, some items 404, such as bulk products, commodities, and so forth, may be stored in continuous or arbitrarily divisible amounts that may not be inherently organized into countable units. Such items 404 may be managed in terms of a measurable quantity such as units of length, area, volume, weight, time, duration, or other dimensional properties characterized by units of measurement. Generally speaking, a quantity of an item 404 may refer to either a countable number of individual or aggregate units of an item 404 or a measurable amount of an item 404, as appropriate.

After arriving through the receiving area 406, items 404 may be stored within the storage area 408. In some implementations, like items 404 may be stored or displayed together in the inventory locations 414 such as in bins, on shelves, hanging from pegboards, and so forth. In this implementation, all items 404 of a given kind are stored in one inventory location 414. In other implementations, like items 404 may be stored in different inventory locations 414. For example, to optimize retrieval of certain items 404 having frequent turnover within a large physical facility 402, those items 404 may be stored in several different inventory locations 414 to reduce congestion that might occur at a single inventory location 414.

When a customer order specifying one or more items 404 is received, or as a user 416 progresses through the facility 402, the corresponding items 404 may be selected or "picked" from the inventory locations 414 containing those items 404. In various implementations, item picking may range from manual to completely automated picking. For example, a user 416 may have a list of items 404 they desire and may progress through the facility 402 picking items 404 from inventory locations 414 within the storage area 408 and placing those items 404 into a tote 418. In other implementations, employees of the facility 402 may pick items 404 using written or electronic pick lists derived from customer orders. These picked items 404 may be placed into the tote 418 as the employee progresses through the facility 402.

After items 404 have been picked, the items 404 may be processed at a transition area 410. The transition area 410 may be any designated area within the facility 402 where items 404 are transitioned from one location to another or from one entity to another. For example, the transition area 410 may be a packing station within the facility 402. When the item 404 arrives at the transition area 410, the items 404 may be transitioned from the storage area 408 to the packing station. Information about the transition may be maintained by the inventory management system 420.

In another example, if the items 404 are departing the facility 402, a list of the items 404 may be obtained and used by the inventory management system 420 to transition responsibility for, or custody of, the items 404 from the facility 402 to another entity. For example, a carrier may accept the items 404 for transport with that carrier accepting responsibility for the items 404 indicated in the list. In another example, a user 416 may purchase or rent the items 404 and remove the items 404 from the facility 402. During use of the facility 402, the user 416 may move about the facility 402 to perform various tasks, such as picking or placing the items 404 in the inventory locations 414.

To facilitate operation of the facility 402, the inventory management system 420 is configured to the output data 132 and other information such as item data, physical layout data, and so forth, to generate interaction data 422. For example, an item 404 that has been picked up by the user 416 may be identified using the data processing system 100. The output data 132 providing the identification may be used to determine a pick or a place of the item 404 from the particular inventory location 414. In another implementation, images acquired from the cameras 108(1) of the inventory location 414 or the tote 418 may be used to identify and determine a quantity present of the different types of items 404.

The interaction data 422 may provide information about an interaction, such as a pick of an item 404 from the inventory location 414, a place of an item 404 to the inventory location 414, a touch made to an item 404 at the inventory location 414, a gesture associated with an item 404 at the inventory location 414, and so forth. The interaction data 422 may include one or more of: the type of interaction, an interaction location identifier indicative of the inventory location 414 where the interaction took place, item identifier, quantity change to the item 404, user identifier, and so forth. The interaction data 422 may then be used to further update the item data. For example, the quantity of items 404 on hand at a particular lane on the shelf may be changed based on an interaction that picks or places one or more items 404.

The inventory management system 420 may combine or otherwise utilize data from different sensors 108 of different types. For example, weight data obtained from weight sensors 108(6) at the inventory location 414 may be used in conjunction with the output data 132 to determine the interaction data 422.

In some implementations, items 404 may be processed, such as at the receiving area 406, to generate at least a portion of the object data 126. For example, image data 110 of an item 404 not previously stored by the inventory management system 420 may be obtained and used to generate the 3D model data 118, feature data 120, and the object data 126, as part of a process to receive the item 404 into the facility 402.

By using the data processing system 100, objects 102 in the facility 402 may be identified quickly using minimal computing resources. As a result, overall performance of the facility 402 may be improved.

Figure 5:
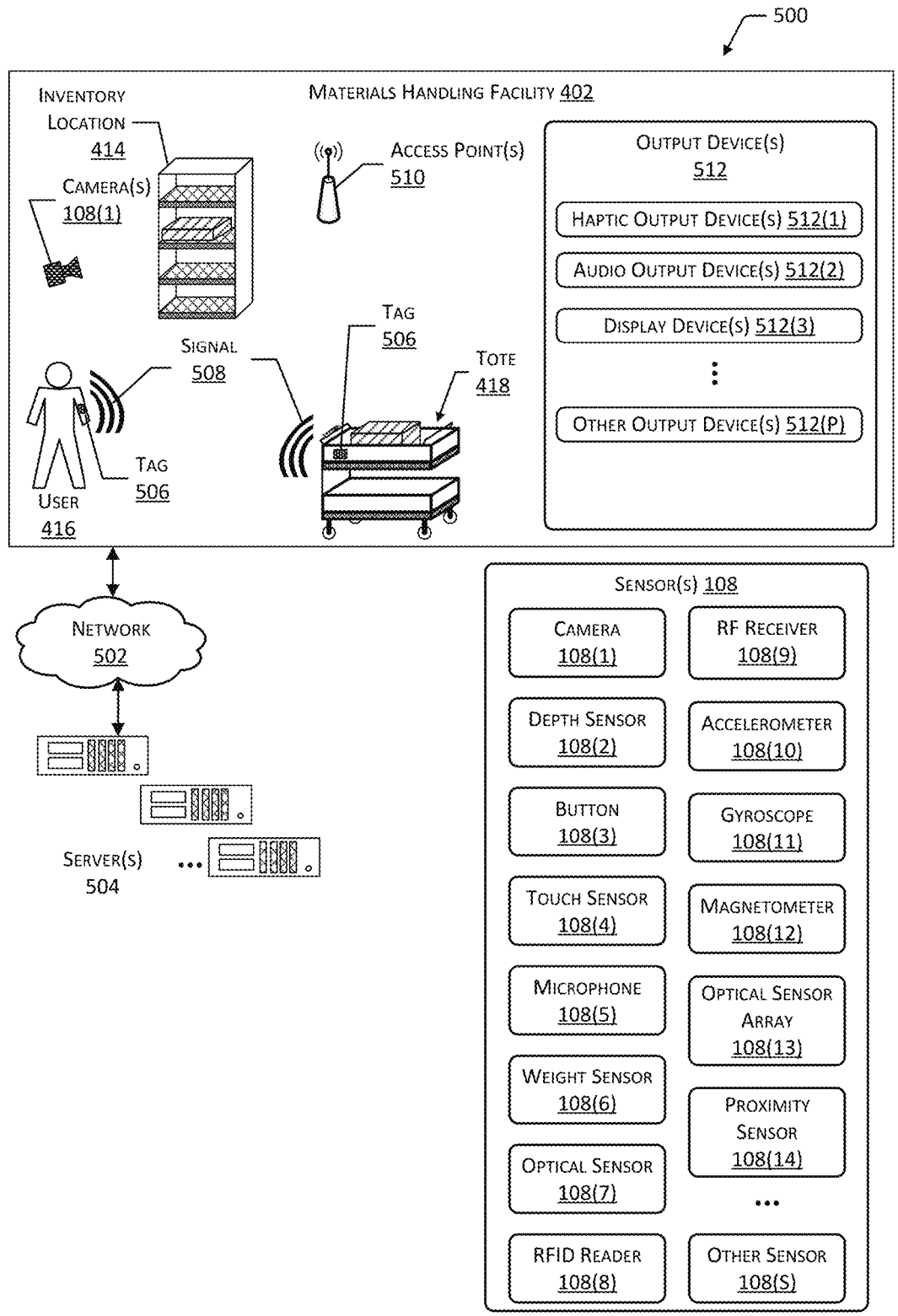
FIG. 5 is a block diagram illustrating additional details of the facility, according to some implementations.

FIG. 5 is a block diagram 500 illustrating additional details of the facility 402, according to some implementations. The facility 402 may be connected to one or more networks 502, which in turn connect to one or more servers 504. The network 502 may include private networks such as an institutional or personal intranet, public networks such as the Internet, or a combination thereof. The network 502 may utilize wired technologies (e.g., wires, fiber optic cables, and so forth), wireless technologies (e.g., radio frequency, infrared, acoustic, optical, and so forth), or other connection technologies. The network 502 is representative of any type of communication network, including one or more of data networks or voice networks. The network 502 may be implemented using wired infrastructure (e.g., copper cable, fiber optic cable, and so forth), a wireless infrastructure (e.g., cellular, microwave, satellite, and so forth), or other connection technologies.

The servers 504 may be configured to execute one or more modules or software applications associated with the inventory management system 420 or other systems. While the servers 504 are illustrated as being in a location outside of the facility 402, in other implementations, at least a portion of the servers 504 may be located at the facility 402. The servers 504 are discussed in more detail below with regard to FIG. 6.

The users 416, the totes 418, or other objects 102 in the facility 402 may be equipped with one or more tags 506. The tags 506 may be configured to emit a signal 508. In one implementation, the tag 506 may be a radio frequency identification (RFID) tag 506 configured to emit a RF signal 508 upon activation by an external signal. For example, the external signal may comprise a radio frequency signal or a magnetic field configured to energize or activate the RFID tag 506. In another implementation, the tag 506 may comprise a transmitter and a power source configured to power the transmitter. For example, the tag 506 may comprise a Bluetooth Low Energy (BLE) transmitter and battery. In other implementations, the tag 506 may use other techniques to indicate presence of the tag 506. For example, an acoustic tag 506 may be configured to generate an ultrasonic signal, which is detected by corresponding acoustic receivers. In yet another implementation, the tag 506 may be configured to emit an optical signal.

The inventory management system 420 may be configured to use the tags 506 for one or more of identification of the object 102, determining a location of the object 102, and so forth. For example, the users 416 may wear tags 506, the totes 418 may have tags 506 affixed, and so forth, which may be read and, based at least in part on signal strength, used to determine identity and location.

Generally, the inventory management system 420 or other systems associated with the facility 402 may include any number and combination of input components, output components, and servers 504.

The one or more sensors 108 may be arranged at one or more locations within the facility 402. For example, the sensors 108 may be mounted on or within a floor, wall, at a ceiling, at an inventory location 414, on a tote 418, may be carried or worn by a user 416, and so forth.

The sensors 108 may include one or more cameras 108(1) or other imaging sensors. The one or more cameras 108(1) may include imaging sensors configured to acquire images of a scene. The cameras 108(1) are configured to detect light in one or more wavelengths including, but not limited to, terahertz, infrared, visible, ultraviolet, and so forth. The cameras 108(1) may comprise charge coupled devices (CCD), complementary metal oxide semiconductor (CMOS) devices, microbolometers, and so forth. The inventory management system 420 may use image data 110 acquired by the cameras 108(1) during operation of the facility 402. For example, the inventory management system 420 may identify items 404, users 416, totes 418, and so forth, based at least in part on their appearance within the image data 110 acquired by the cameras 108(1). The cameras 108(1) may be mounted in various locations within the facility 402. For example, cameras 108(1) may be mounted overhead, on inventory locations 414, may be worn or carried by users 416, may be affixed to totes 418, and so forth.

One or more depth sensors 108(2) may also be included in the sensors 108. The depth sensors 108(2) are configured to acquire spatial or 3D data, such as depth information, about objects 102 within a field-of-view. The depth sensors 108(2) may include range cameras, lidar systems, sonar systems, radar systems, structured light systems, stereo vision systems, optical interferometry systems, and so forth. The inventory management system 420 may use the 3D data acquired by the depth sensors 108(2) to identify objects 102, determine a location of an object 102 in 3D real space, and so forth. In some implementations, the depth sensors 108(2) may provide data that is used to generate or select perspective transformation data. For example, the 3D data may be used to determine the 3D model data 118.

One or more buttons 108(3) may be configured to accept input from the user 416. The buttons 108(3) may comprise mechanical, capacitive, optical, or other mechanisms. For example, the buttons 108(3) may comprise mechanical switches configured to accept an applied force from a touch of the user 416 to generate an input signal. The inventory management system 420 may use data from the buttons 108(3) to receive information from the user 416. For example, the tote 418 may be configured with a button 108(3) to accept input from the user 416 and send information indicative of the input to the inventory management system 420.

The sensors 108 may include one or more touch sensors 108(4). The touch sensors 108(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 420 may use data from the touch sensors 108(4) to receive information from the user 416. For example, the touch sensor 108(4) may be integrated with the tote 418 to provide a touchscreen with which the user 416 may select from a menu one or more particular items 404 for picking, enter a manual count of items 404 at an inventory location 414, and so forth.

One or more microphones 108(5) may be configured to acquire information indicative of sound present in the environment. In some implementations, arrays of microphones 108(5) may be used. These arrays may implement beamforming techniques to provide for directionality of gain. The inventory management system 420 may use the one or more microphones 108(5) to acquire information from acoustic tags 506, accept voice input from the users 416, determine ambient noise level, and so forth.

One or more weight sensors 108(6) are configured to measure the weight of a load, such as the item 404, the tote 418, or other objects 102. The weight sensors 108(6) may be configured to measure the weight of the load at one or more of the inventory locations 414, the tote 418, on the floor of the facility 402, and so forth. For example, the shelf may include a plurality of lanes or platforms, with one or more weight sensors 108(6) beneath each one to provide weight sensor data about an individual lane or platform. The weight sensors 108(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 108(6) may operate as transducers that generate one or more signals based on an applied force, such as that of the load due to gravity. For example, the weight sensor 108(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 108(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 420 may use the data acquired by the weight sensors 108(6) to identify an object 102, determine a change in the quantity of objects 102, determine a location of an object 102, maintain shipping records, and so forth.

The sensors 108 may include one or more optical sensors 108(7). The optical sensors 108(7) may be configured to provide data indicative of one or more of color or intensity of light impinging thereupon. For example, the optical sensor 108(7) may comprise a photodiode and associated circuitry configured to generate a signal or data indicative of an incident flux of photons. As described below, the optical sensor array 108(13) may comprise a plurality of the optical sensors 108(7). For example, the optical sensor 108(7) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 108(7) may be used. The optical sensors 108(7) may be sensitive to one or more of infrared light, visible light, or ultraviolet light. For example, the optical sensors 108(7) may be sensitive to infrared light, and infrared light sources such as LEDs may provide illumination.

The optical sensors 108(7) may include photodiodes, photoresistors, photovoltaic cells, quantum dot photoconductors, bolometers, pyroelectric infrared detectors, and so forth. For example, the optical sensor 108(7) may use germanium photodiodes to detect infrared light.

One or more radio frequency identification (RFID) readers 108(8), near field communication (NFC) systems, and so forth, may be included as sensors 108. For example, the RFID readers 108(8) may be configured to read the RF tags 506. Information acquired by the RFID reader 108(8) may be used by the inventory management system 420 to identify an object 102 associated with the RF tag 506 such as the item 404, the user 416, the tote 418, and so forth. For example, based on information from the RFID readers 108(8) detecting the RF tag 506 at different times and RFID readers 108(8) having different locations in the facility 402, a velocity of the RF tag 506 may be determined.

One or more RF receivers 108(9) may also be included as sensors 108. In some implementations, the RF receivers 108(9) may be part of transceiver assemblies. The RF receivers 108(9) may be configured to acquire RF signals associated with Wi-Fi, Bluetooth, ZigBee, 5G, 4G, 3G, LTE, or other wireless data transmission technologies. The RF receivers 108(9) may provide information associated with data transmitted via radio frequencies, signal strength of RF signals, and so forth. For example, information from the RF receivers 108(9) may be used by the inventory management system 420 to determine a location of an RF source, such as a communication interface onboard the tote 418.

The sensors 108 may include one or more accelerometers 108(10), which may be worn or carried by the user 416, mounted to the tote 418, and so forth. The accelerometers 108(10) may provide information such as the direction and magnitude of an imposed acceleration. Data such as rate of acceleration, determination of changes in direction, speed, and so forth, may be determined using the accelerometers 108(10).

A gyroscope 108(11) may provide information indicative of rotation of an object affixed thereto. For example, the tote 418 or other objects may be equipped with a gyroscope 108(11) to provide data indicative of a change in orientation of the object.

A magnetometer 108(12) may be used to determine an orientation by measuring ambient magnetic fields, such as the terrestrial magnetic field. The magnetometer 108(12) may be worn or carried by the user 416, mounted to the tote 418, and so forth. For example, the magnetometer 108(12) mounted to the tote 418 may act as a compass and provide information indicative of which direction the tote 418 is oriented.

An optical sensor array 108(13) may comprise one or more optical sensors 108(7). The optical sensors 108(7) may be arranged in a regular, repeating, or periodic two-dimensional arrangement such as a grid. The optical sensor array 108(13) may generate image data 110. For example, the optical sensor array 108(13) may be arranged within or below an inventory location 414 and obtain information about shadows of items 404, hand of the user 416, and so forth.

The sensors 108 may include proximity sensors 108(14) used to determine presence of an object 102, such as the user 416, the tote 418, and so forth. The proximity sensors 108(14) may use optical, electrical, ultrasonic, electromagnetic, or other techniques to determine a presence of an object 102. In some implementations, the proximity sensors 108(14) may use an optical emitter and an optical detector to determine proximity. For example, an optical emitter may emit light, a portion of which may then be reflected by the object 102 back to the optical detector to provide an indication that the object 102 is proximate to the proximity sensor 108(14). In other implementations, the proximity sensors 108(14) may comprise a capacitive proximity sensor 108(14) configured to provide an electrical field and determine a change in electrical capacitance due to presence or absence of an object within the electrical field.

The proximity sensors 108(14) may be configured to provide sensor data indicative of one or more of a presence or absence of an object 102, a distance to the object 102, or characteristics of the object 102. An optical proximity sensor 108(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object 102 may be determined. In another implementation, a structured light pattern may be provided by the optical emitter. A portion of the structured light pattern may then be detected on the object 102 using a sensor 108 such as a camera 108(1). Based on an apparent distance between the features of the structured light pattern, the distance to the object 102 may be calculated. Other techniques may also be used to determine distance to the object 102. In another example, the color of the reflected light may be used to characterize the object 102, such as skin, clothing, tote 418, and so forth.

The sensors 108 may include other sensors 108(5) as well. For example, the other sensors 108(S) may include light curtains, ultrasonic rangefinders, thermometers, barometric sensors, hygrometers, and so forth. For example, the inventory management system 420 may use information acquired from thermometers and hygrometers in the facility 402 to direct the user 416 to check on delicate items 404 stored in a particular inventory location 414, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 414, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 416 hand would prevent at least some of the light from light emitters from reaching a corresponding light detector. As a result, a position along the linear array of the object 102 may be determined that is indicative of a touchpoint. This position may be expressed as touchpoint data, with the touchpoint being indicative of the intersection between the hand of the user 416 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 416 may be used to trigger acquisition or selection of image data 110 for processing by the search module 128.

The other sensors 108(S) may also include an instrumented auto-facing unit (AFU). The instrumented AFU may comprise a position sensor configured to provide data indicative of displacement of a pusher. As an item 404 is removed from the AFU, the pusher moves, such as under the influence of a spring, and pushes the remaining items 404 in the AFU to the front of the inventory location 414. By using data from the position sensor, and given item data such as a depth of an individual item 404, a count may be determined, based on a change in position data. For example, if each item 404 is 1 inch deep, and the position data indicates a change of 5 inches, the quantity held by the AFU may have changed by 5 items 404. This count information may be used to confirm or provide a cross check for the output data 132.

In some implementations, the camera 108(1) or other sensors 108(S) may include hardware processors, memory, and other elements configured to perform various functions. For example, the cameras 108(1) may be configured to generate image data 110, send the image data 110 to another device such as the server 504, and so forth.

The facility 402 may include one or more access points 510 configured to establish one or more wireless networks. The access points 510 may use Wi-Fi, NFC, Bluetooth, or other technologies to establish wireless communications between a device and the network 502. The wireless networks allow the devices to communicate with one or more of the sensors 108, the inventory management system 420, the tag 506, a communication device of the tote 418, or other devices.

Output devices 512 may also be provided in the facility 402. The output devices 512 are configured to generate signals, which may be perceived by the user 416 or detected by the sensors 108. In some implementations, the output devices 512 may be used to provide illumination of the optical sensor array 108(13).

Haptic output devices 512(1) are configured to provide a signal that results in a tactile sensation to the user 416. The haptic output devices 512(1) may use one or more mechanisms such as electrical stimulation or mechanical displacement to provide the signal. For example, the haptic output devices 512(1) may be configured to generate a modulated electrical signal, which produces an apparent tactile sensation in one or more fingers of the user 416. In another example, the haptic output devices 512(1) may comprise piezoelectric or rotary motor devices configured to provide a vibration, which may be felt by the user 416.

One or more audio output devices 512(2) may be configured to provide acoustic output. The acoustic output includes one or more of infrasonic sound, audible sound, or ultrasonic sound. The audio output devices 512(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 512(3) may be configured to provide output, which may be seen by the user 416 or detected by a light-sensitive sensor such as a camera 108(1) or an optical sensor 108(7). In some implementations, the display devices 512(3) may be configured to produce output in one or more of infrared, visible, or ultraviolet light. The output may be monochrome or in color. The display devices 512(3) may be one or more of emissive, reflective, microelectromechanical, and so forth. An emissive display device 512(3), such as using LEDs, is configured to emit light during operation. In comparison, a reflective display device 512(3), such as using an electrophoretic element, relies on ambient light to present an image. Backlights or front lights may be used to illuminate non-emissive display devices 512(3) to provide visibility of the output in conditions where the ambient light levels are low.

The display devices 512(3) may be located at various points within the facility 402. For example, the addressable displays may be located on inventory locations 414, totes 418, on the floor of the facility 402, and so forth.

Other output devices 512(P) may also be present. For example, the other output devices 512(P) may include scent/odor dispensers, document printers, 3D printers or fabrication equipment, and so forth.

Figure 6:
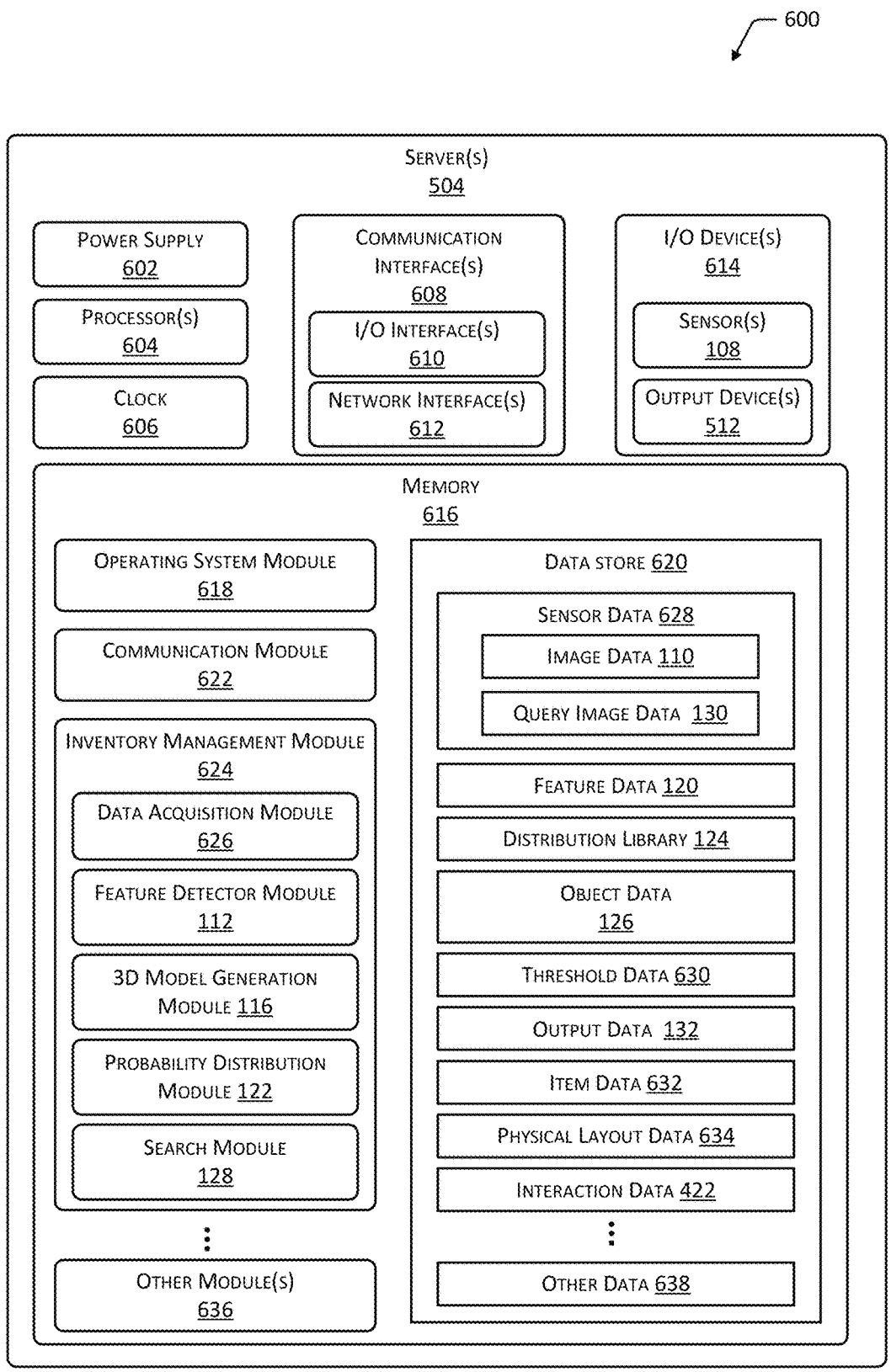
FIG. 6 is a block diagram of a server to support operation of the facility, including the data processing system, according to some implementations.

FIG. 6 illustrates a block diagram 600 of a server 504 configured to support operation of the facility 402, according to some implementations. The server 504 may be physically present at the facility 402, may be accessible by the network 502, or a combination of both. The server 504 does not require end-user knowledge of the physical location or configuration of the system that delivers the services. Common expressions associated with the server 504 may include "on-demand computing", "software as a service (SaaS)", "platform computing", "network-accessible platform", "cloud services", "data centers", and so forth. Services provided by the server 504 may be distributed across one or more physical or virtual devices.

One or more power supplies 602 may be configured to provide electrical power suitable for operating the components in the server 504. The one or more power supplies 602 may comprise batteries, capacitors, fuel cells, photovoltaic cells, wireless power receivers, conductive couplings suitable for attachment to an external power source such as provided by an electric utility, and so forth. The server 504 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The server 504 may include one or more communication interfaces 608 such as input/output (I/O) interfaces 610, network interfaces 612, and so forth. The communication interfaces 608 enable the server 504, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 108, keyboard, mouse, scanner, and so forth. The I/O devices 614 may also include output devices 512 such as one or more of a display device 512(3), printer, audio speakers, and so forth. In some embodiments, the I/O devices 614 may be physically incorporated with the server 504 or may be externally placed.

The network interfaces 612 may be configured to provide communications between the server 504 and other devices, such as the totes 418, routers, access points 510, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The server 504 may also include one or more busses or other internal communications hardware or software that allow for the transfer of data between the various modules and components of the server 504.

As shown in FIG. 6, the server 504 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the server 504. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 504, network attached storage devices, and so forth.

A communication module 622 may be configured to establish communications with one or more of the totes 418, sensors 108, display devices 512(3), other servers 504, or other devices. The communications may be authenticated, encrypted, and so forth.

The memory 616 may store an inventory management module 624. The inventory management module 624 is configured to provide the inventory functions as described herein with regard to the inventory management system 420. For example, the inventory management module 624 may track items 404 between different inventory locations 414, to and from the totes 418, and so forth.

The inventory management module 624 may include one or more of a data acquisition module 626, the feature detector module 112, the 3D model generation module 116, the probability distribution module 122, the search module 128, or other modules. The data acquisition module 626 may be configured to acquire and access information associated with operation of the facility 402. For example, the data acquisition module 626 may be configured to acquire sensor data 628 from one or more of the sensors 108. The sensor data 628 may include the image data 110, the query image data 130, and so forth.

The feature detector module 112, as also described above, may generate one or more of the ungrouped feature data 114 or the feature data 120. The feature detector module 112 may implement one or more of: feature detection algorithms to determine the presence of features 104, algorithms to generate local descriptor values 208 for those features 104, and so forth. The feature detection algorithms may include, but are not limited to one or more of a MSER algorithm, a Harris affine region algorithm, an ORB algorithm, a DAISY algorithm, a difference of Gaussian blob detector algorithm, a Laplacian of Gaussian blob detector algorithm, or a determinant of Hessian blob algorithm.

The algorithms to generate the local descriptor values 208 may include, but are not limited to one or more of a SIFT algorithm published by David Lowe, a gradient location and orientation histogram (GLOH), the speeded up robust features (SURF) algorithm published by Herbert Bay, Tinne Tuytelaars, and Luc Van Gool, a histogram of gradients (HOG) algorithm, and so forth. In some implementations, the feature detection algorithms may be different from those used to generate the local descriptor values 208.

In some implementations, the same algorithm may detect the feature 104 and generate the local descriptor values 208 for each of the features 104 that are detected. For example, the SIFT algorithm may be used for feature detection and local descriptor value 208 generation.

As described above, the 3D model generation module 116 may generate the 3D model data 118. In some implementations, the 3D model generation module 116 may use the image data 110 to generate the 3D model data 118. For example, structure-from-motion algorithms may be used to generate a mesh model of the object 102. In other implementations, sensor data 628 from a depth sensor 108(2) may be used to generate the 3D model data 118. The 3D model data 118 may then be used to associate ungrouped feature data 114 and determine the feature data 120. For example, the 3D model data 118 may be used to associate a particular feature 104 in one image with another feature 104 in another image.

Processing of one or more of the image data 110 or the query image data 130 may be performed by implementing, at least in part, one or more of the following tools or techniques. In one implementation, processing of the image data 110 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 628. In still another implementation, functions such as those in the Machine Vision Toolbox for Matlab (MVTB) available using MATLAB as developed by MathWorks, Inc. of Natick, Mass., USA, may be utilized.

Other libraries, functions, or tools may be utilized as well. For example, the libmv library as promulgated by Andrew Chant, Daniel Waterworth, Darius Blaszyk, et al., the sfm_toolbox as promulgated by Vincent Rabaud, and so forth, may be utilized to implement structure-from-motion to generate the 3D model data 118.

The probability distribution module 122 uses the feature data 120 generated by the feature detector module 112 to generate the object data 126. The search module 128 may be used to process query image data 130, analyze using the object data 126, and generate output data 132. The output data 132 may comprise data such as an object identifier 302 indicative of a particular object 102 that is in the query image data 130.

The data store 620 may store threshold data 630. The threshold data 630 may specify one or more thresholds associated with operation of the data processing system 100 or other systems such as the inventory management system 420. For example, the threshold data 630 may specify a minimum probability as determined by the search module 128 that is deemed to indicate an object 102 has been identified.

The item data 632 provides information about a particular type of item 404, including characteristics of that type of item 404 such as physical dimensions, where that type of item 404 is located in the facility 402, and so forth. For example, the item data 632 may indicate the types and quantities of items 404 that are expected to be stored at that particular inventory location 414 such as in a particular lane on a shelf, weight of the item 404 individually or in aggregate, and so forth.

The physical layout data 634 may provide information indicative of where sensors 108 and inventory locations 414 are in the facility 402 with respect to one another, pose of the sensor 108 relative to the inventory location 414, and so forth. For example, the physical layout data may comprise information representative of a map or floor plan of the facility 402 with relative positions of inventory locations 414, planogram data indicative of how items 404 are to be arranged at the inventory locations 414, and so forth. In another example, the physical layout data 634 may indicate that camera 108 is positioned in front of inventory location 414(37) and posed with a centerline of field-of-view of the sensor 108(1)(1) looking towards the back of the inventory location 414(37) and angled 30 degrees below horizontal.

Other modules 636 may also be present in the memory 616 as well as other data 638 in the data store 620. For example, the other modules 636 may include an accounting module while the other data 638 may include billing data. The accounting module may be configured to assess charges to accounts associated with particular users 416 or other entities, while the billing data may include information such as payment account numbers.

In one implementation, the other modules 636 may include a rendering module. The rendering module may use previously stored object data 126 to generate an image of the object 102. The object data 126 may include data indicative of interrelationships between different features 104, such as cross-correlations between the probability distribution data 304 of a first feature 104(1) and a second feature 104(2).

In another implementation, other modules 636 may include a 3D printing module. The object data 126 may be processed to generate fabrication instructions to form a 3D object 102 from feedstock material.

Illustrative Processes

Figure 7:
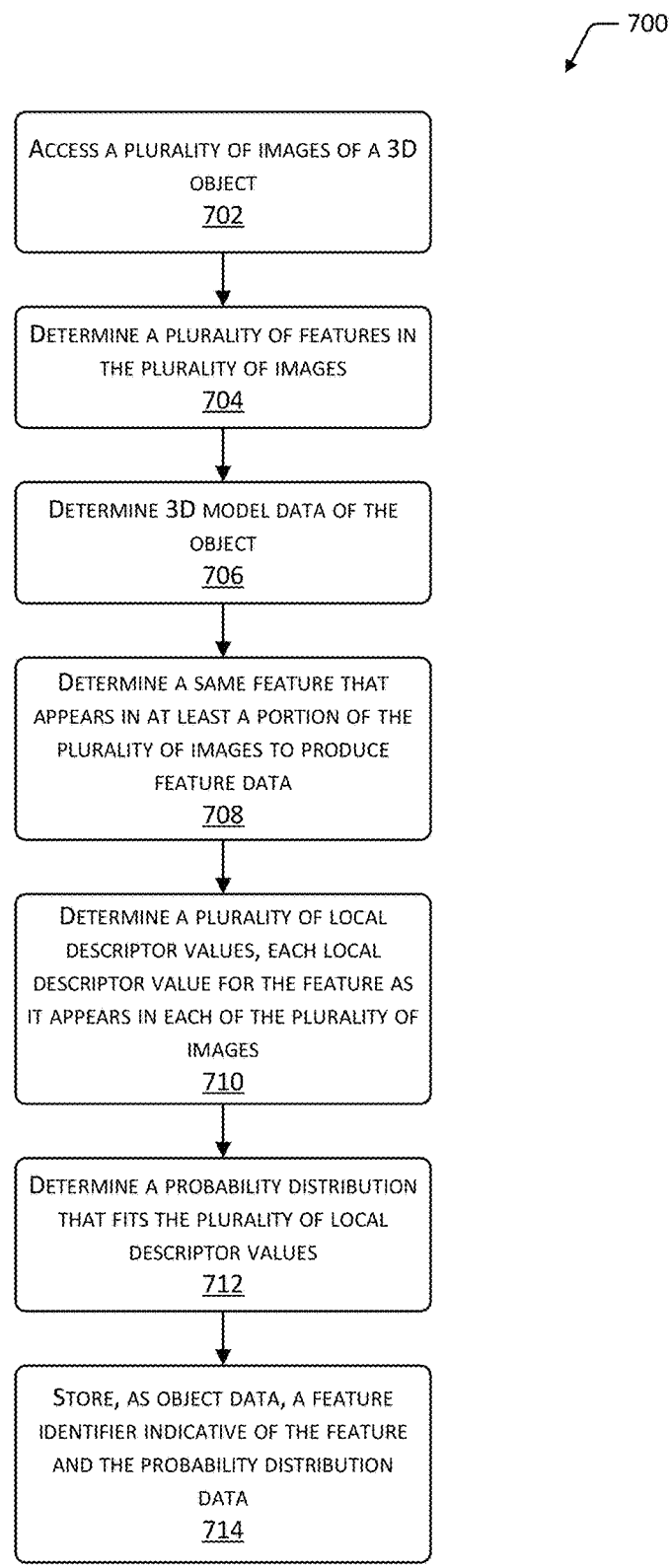
FIG. 7 depicts a flow diagram of a process for generating object data, according to some implementations.

FIG. 7 depicts a flow diagram 700 of a process for generating object data 126, according to some implementations. The process may be implemented at least in part by one or more of the 3D model generation module 116, the feature detector module 112, or the probability distribution module 122. In different implementations, one or more of the blocks described below may be omitted, the sequence of the process using these blocks may vary from that depicted, and so forth.

Block 702 accesses image data 110. The image data 110 may comprise a plurality of images of a 3D object 102. At least some of the plurality of images may be obtained from different camera poses relative to the 3D object 102. For example, a first image may be obtained with a first camera pose, a second image may be obtained with a second camera pose, and so forth.

Block 704 determines a plurality of features 104 in the image data 110. Ungrouped feature data 114 may be generated. For example, the features 104 in the plurality of images may be detected using a feature detection algorithm. The feature detection algorithm may use one or more of a MSER algorithm, a Harris affine region algorithm, an ORB algorithm, a DAISY algorithm, a difference of Gaussian blob detector algorithm, a Laplacian of Gaussian blob detector algorithm, or a determinant of Hessian blob algorithm, and so forth. Each of the features 104 may be assigned a feature identifier 202.

In some implementations, one or more of the plurality of images may be rectified to produce images that appear to have been obtained from a predefined apparent camera pose. A transform function may be applied to the images to shift the apparent camera pose of the images to that of a virtual camera located with different camera pose coordinates. For example, an image obtained from off center may be rectified to appear to have been obtained from directly in front of the object 102.

In some implementations, one or more of the plurality of images may be registered with respect to a particular coordinate system, with respect to one another, or a combination thereof. For example, the plurality of images may be aligned such that the same reference point appears at the same apparent location in frame for all of the images. In some implementations, the registration process may include a skew, warp, or other transform function to relocate at least some of the pixels in the image.

Block 706 determines 3D model data 118 of the 3D object 102 based on the plurality of images. For example, a surface-from-motion algorithm may be used to generate a 3D mesh model of the surface of the object 102 using the features 104 described in the ungrouped feature data 114.

Block 708 determines, from at least a portion of the plurality of images, a same feature 104 appears in the at least a portion of the plurality of images to generate feature data 120. In one implementation, based at least in part on the 3D model data 118, a camera pose for one or more of the at least a portion of the plurality of images may be determined. For example, the camera pose may be known based on data such as turntable rotation and known camera 108(1) position. With the camera pose known, the same feature 104 that appears in at least a portion of the plurality of images may be determined based on known displacement of the camera 108(1) relative to the object 102, position of the feature 104 in one of the images, and so forth.

Block 710 determines local descriptor values 208 for at least some of the features 104 that were determined. In one implementation, for each image in the at least a portion of the plurality of images, a local descriptor value 208 may be determined for the feature 104 that appears in plurality of images and expressed in the feature data 120. For example, the local descriptor value 208 may be indicative of a gradient of pixels that describe a patch 106 on the surface of the object 102.

Block 712 determines probability distribution data 304 that fits a plurality of the local descriptor values 208 of the same feature 104 that appears in the at least a portion of the plurality of images. For example, the probability distribution data 304 may comprise a distribution identifier 306 and one or more distribution parameters 308. The probability distribution data 304 describes the probability distribution that is expressed by the set of local descriptor values 208 for the same feature 104. The probability distributions may be discrete, continuous, and so forth. For example, the probability distribution may comprise a probability density function that represents a probability distribution with discrete and continuous parts.

Block 714 stores, as object data 126, one or more of: an object identifier 302 indicative of the 3D object 102, a feature identifier 202 indicative of a particular one of the features 104 of the 3D object 102, and probability distribution data 304. As described above, the probability distribution data 304 may include a distribution identifier 306 and one or more distribution parameters 308. For example, the distribution identifier 306 may indicate that the probability distribution is Gaussian, and the distribution parameters 308 may specify values of a mean and a standard deviation for the probability distribution.

In some implementations, the object data 126 may be generated from 3D model data 118, without recourse to image data 110 obtained from cameras 108(1). For example, computer aided design (CAD) or computer-aided manufacturing (CAM) data descriptive of the object 102 may be used. Virtual images may be generated from using the CAD/CAM data. These virtual images may be used in place of the image data 110 described above. For example, the local descriptor value 208 may be indicative of a value of a gradient in the virtual image of the 3D object 102, given a particular camera pose.

In yet another implementation, the use of virtual images may be omitted, and the features 104 and corresponding local descriptor values 208 may be determined by processing the CAD/CAM data.

As described next with regard to FIGS. 8 and 9, the object data 126 may be used for various purposes. For example, query image data 130 may be processed to determine if the image depicts an object 102 described in the object data 126.

Figure 8:
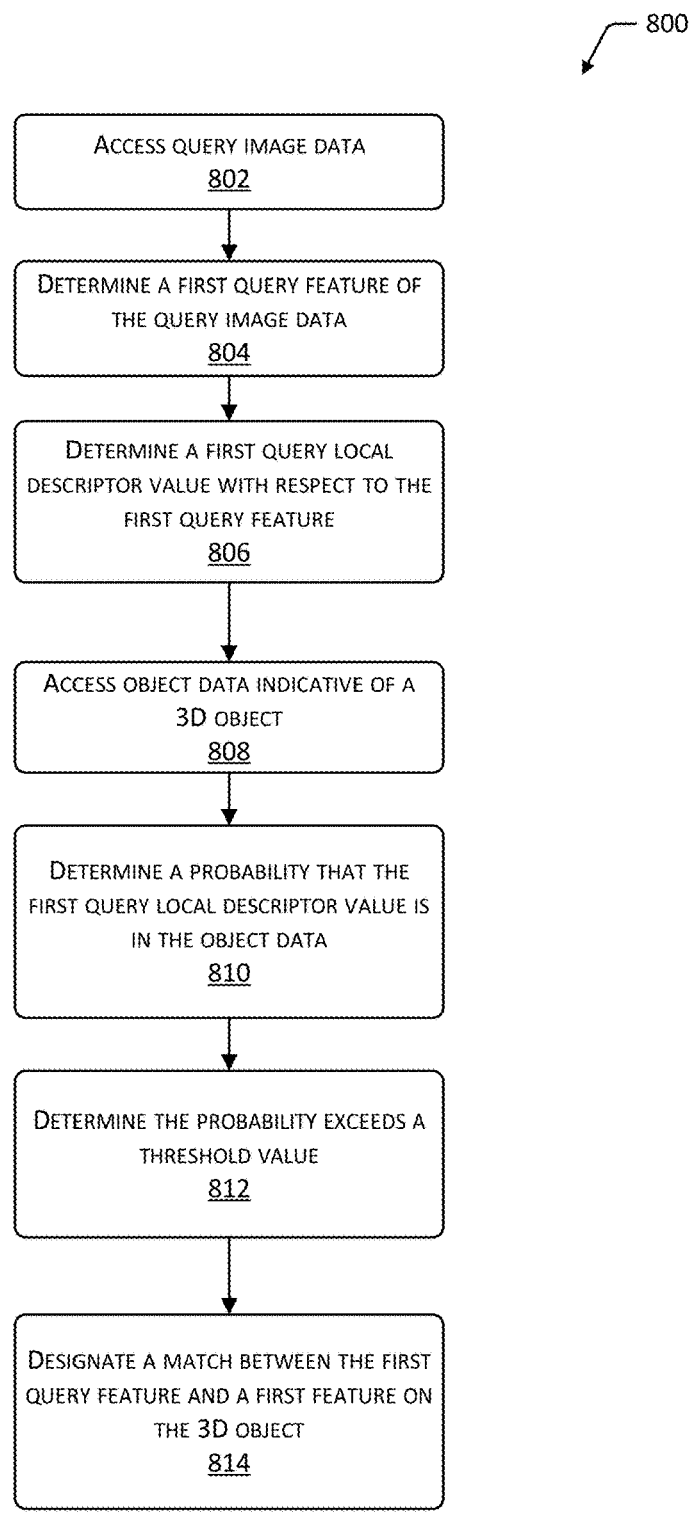
FIG. 8 depicts a flow diagram of a process for identifying an object using the object data, according to some implementations.

FIG. 8 depicts a flow diagram 800 of a process for identifying an object 102 using the object data 126, according to some implementations. The process may be implemented at least in part by one or more of the feature detector module 112, the probability distribution module 122, or the search module 128. In different implementations, one or more of the blocks described below may be omitted, the sequence of the process using these blocks may vary from that depicted, and so forth.

Block 802 accesses query image data 130. For example, a camera 108(1) may generate the query image data 130 which may be provided to the search module 128. In some implementations, the query image data 130 may have one or more transforms applied. For example, the query image data 130 may have a transform function applied to rectify the image such that it appears to be obtained from a predefined apparent camera pose. In one implementation, the transform may utilize the warpPerspective function of OpenCV.

Block 804 determines a first query feature of the query image data 130. For example, a feature detection algorithm such as the SIFT algorithm may be used.

Block 806 determines a first query local descriptor value 208 produced by the feature detection algorithm with respect to the first query feature. For example, the first query local descriptor value 208 may comprise a 130 dimensional value generated by the SIFT algorithm.

Block 808 accesses the object data 126. As described above, the object data 126 may include one or more of: an object identifier 302 indicative of a 3D object 102, a feature identifier 202 indicative of a feature 104 on the 3D object 102, and probability distribution data 304. The probability distribution data 304 may include a distribution identifier 306 and one or more distribution parameters 308. The distribution identifier 306 is indicative of a type of probability distribution that is descriptive of a plurality of local descriptor values 208 of the feature 104. The one or more distribution parameters 308 may be indicative of a constant value used to define one or more characteristics of the type of probability distribution. For example, where the distribution identifier 306 is indicative of a Gaussian probability distribution, the distribution parameters 308 may comprise the mean and the standard deviation. Each of the local descriptor values 208 may be determined using the same feature detection algorithm as used to generate the object data 126 from an image of the 3D object 102 at different camera poses.

Block 810 determines a probability that the query local descriptor value 208 is in the object data 126. For example, the probability may be calculated by using the probability distribution function 312 associated with the distribution identifier 306 and the distribution parameter 308, with the local descriptor value 208 as an input.

Block 812 determines the probability of the query local descriptor value 208 exceeds a threshold value. For example, the probability may be 0.95 and the threshold may be 0.90.

Block 814 designates a match between the query feature and the feature 104 on the 3D object 102. For example, the match may indicate that the query feature has a local descriptor value 208 that has a high probability of being found in the probability distribution for a feature 104 of the 3D object 102.

Additional query features may be utilized and tested against the object data 126 to determine other matches. Once a plurality of matches with probabilities above the threshold value have been determined, the object identifier 302 associated with the greatest count of matching probability distributions may be deemed to be representative of the object 102 depicted in the query image data 130.

Figure 9:
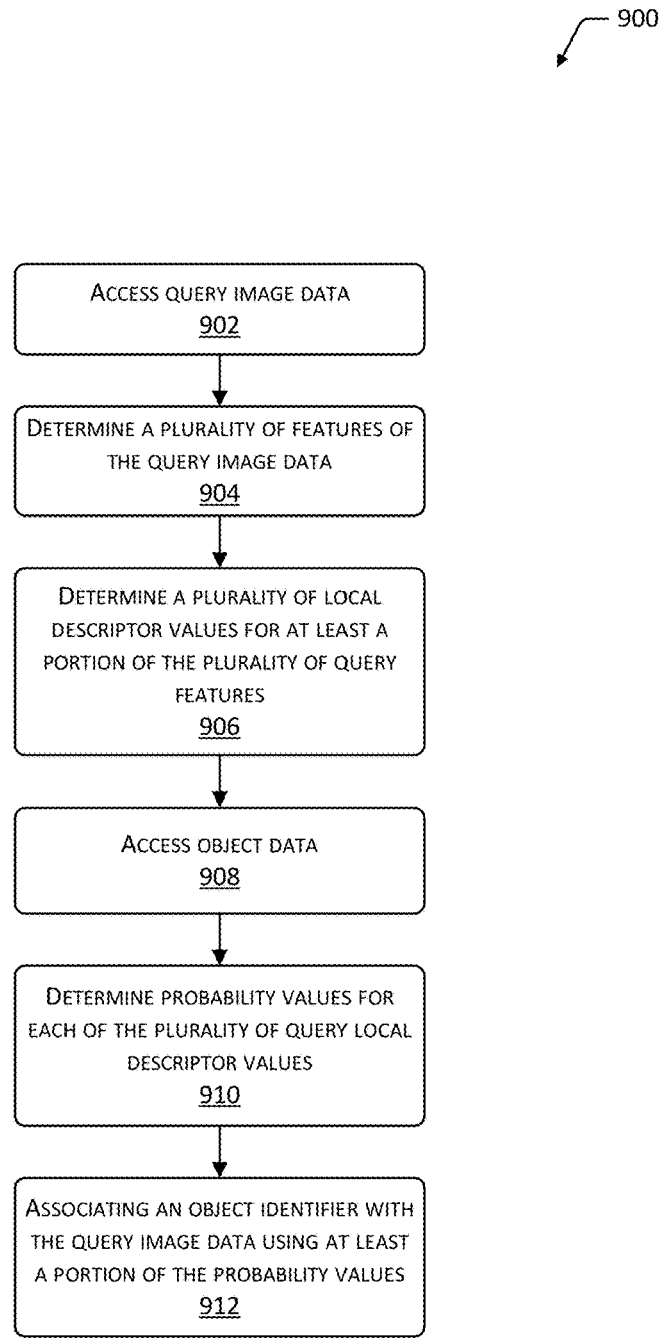
FIG. 9 depicts a flow diagram of another process for identifying an object using the object data, according to some implementations.

FIG. 9 depicts a flow diagram 900 of another process for identifying an object 102 using the object data 126, according to some implementations. The process may be implemented at least in part by one or more of the 3D model generation module 116, the feature detector module 112, or the probability distribution module 122. In different implementations, one or more of the blocks described below may be omitted, the sequence of the process using these blocks may vary from that depicted, and so forth.

Block 902 accesses query image data 130. For example, the query image data 130 may be obtained from a camera 108(1)(1) at an inventory location 414 within the facility 402.

Block 904 determines a plurality of query features of the query image data 130 using a feature detection algorithm. The determination of the plurality of query features may using one or more of: a MSER algorithm, a Harris affine region algorithm, an ORB algorithm, a DAISY algorithm, a difference of Gaussian blob detector algorithm, a Laplacian of Gaussian blob detector algorithm, or a determinant of Hessian blob algorithm, and so forth.

Block 906 determines a plurality of query local descriptor values 208 for at least a portion of the plurality of query features. In some implementations, the determination of the plurality of query features of the query image data 130 also generates a respective one of the query local descriptor values 208 for each determined one of the query features. The determination of the plurality of query local descriptor values 208 may use one or more of: the SIFT algorithm, the GLOH, the SURF algorithm, a HOG algorithm, and so forth.

Block 908 accesses object data 126. In some implementations, the object data 126 may be stored as one or more of a k-dimensional tree or a hash table.

Block 910 determines probability values for each of the plurality of query local descriptor values. The probability values may be determined for at least a portion of the plurality of query features. This determination may use the type of probability distribution and the distribution parameter 308 associated with each of the plurality of query features. The probability value may be indicative of a probability that the query local descriptor value is in the object data 126.

In one implementation, the probability values may be determined by generating an expression based on the probability distribution and the distribution parameters 308. For example, an equation that describes the probability distribution may be populated with the particular distribution parameters 308 associated with a particular feature identifier 202. The query local descriptor value may be used as an input to the expression. The expression, using the query local descriptor value, may then be processed by the processor 604 to generate output. The output from the processed expression is indicative of the probability that the query local descriptor value is represented by the object data 126.

Block 912 associates an object identifier 302 with the query image data 130 using at least a portion of the probability values. In one implementation, a first block may determine a set of top k distribution identifiers 306, sorted in descending order of probability value, wherein k is a non-zero integer value. A second block may determine a set of the object identifiers 302 associated with the set of top k distribution identifiers 306. A third block may determine the object identifier 302 having a greatest frequency of occurrence in the set of object identifiers 302 associated with the set of top k distribution identifiers 306.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
accessing a query image;
determining a query feature of the query image using a scale-invariant feature transform (SIFT) algorithm;
determining a query local descriptor value produced by the SIFT algorithm with respect to the query feature;
accessing object data comprising:
an object identifier indicative of a three-dimensional (3D) object,
a feature identifier indicative of a feature on the 3D object,
a distribution identifier indicative of a type of probability distribution descriptive of a plurality of local descriptor values of the feature, each of the plurality of local descriptor values indicative of the feature as viewed from a particular camera pose,
a distribution parameter associated with the distribution identifier, wherein the distribution parameter is indicative of a constant value used to define one or more characteristics of the type of probability distribution;
determining, using the type of probability distribution and the distribution parameter, a probability that the query local descriptor value is represented by the object data;
determining the probability of the query local descriptor value exceeds a threshold value; and
generating data indicative of a match between the query feature and the feature on the 3D object.

2. The method of claim 1, the determining the probability that the query local descriptor value is represented by the object data comprising:
generating an expression based on the probability distribution and the distribution parameter;
using the query local descriptor value as an input to the expression;
processing the expression; and
storing output from the expression that is indicative of the probability that the query local descriptor value is represented by the object data.

3. A method comprising:
accessing an image;
determining a query feature of the image using a feature detection algorithm;
determining a local descriptor value for the query feature;
accessing object data comprising:
an object identifier indicative of a three-dimensional (3D) object,
a feature identifier indicative of a feature on the 3D object,
a distribution identifier indicative of a type of probability distribution descriptive of a plurality of local descriptor values that are associated with the feature, and
a distribution parameter associated with the distribution identifier;
determining a probability value using the type of probability distribution indicated by the distribution identifier, the distribution parameter, and the local descriptor value;
comparing the probability value to a threshold value; and
determining whether the 3D object is in the image, based on a result of the comparing.

4. The method of claim 3, further comprising:
determining a set of top k distribution identifiers sorted in descending order of the probability value, wherein k is a nonzero integer value;
determining a set of object identifiers associated with the set of top k distribution identifiers; and
determining one object identifier having a greatest frequency of occurrence in the set of object identifiers associated with the set of top k distribution identifiers.

5. The method of claim 3, the determining the probability value comprising:
generating an expression based on the probability distribution and the distribution parameter;
using the local descriptor value for the query feature as an input to the expression;
processing the expression; and
storing output from the expression that is indicative of a probability that the local descriptor value for the query feature is represented by the object data.

6. The method of claim 3, wherein the object data is stored as one or more of a k-dimensional tree or a hash table.

7. The method of claim 3, further comprising:
determining the probability value exceeds the threshold value;
determining the 3D object is in the image, based on the probability value exceeding the threshold value; and
generating, based on the probability value, identification data for the image indicative of the 3D object.

8. The method of claim 3, wherein the determining the local descriptor value comprises using one or more of: a scale-invariant feature transform (SIFT) algorithm, a gradient location and orientation histogram (GLOH), a speeded up robust features (SURF) algorithm, or a histogram of gradients (HOG) algorithm.

9. The method of claim 3, wherein the feature detection algorithm includes one or more of: a maximally stable extremal regions (MSER) algorithm, a Harris affine region algorithm, an oriented FAST and rotated BRIEF (ORB) algorithm, a DAISY algorithm, a difference of Gaussian blob detector algorithm, a Laplacian of Gaussian blob detector algorithm, or a determinant of Hessian blob algorithm.

10. The method of claim 3, wherein the type of probability distribution includes one or more of: a Gaussian distribution, a binomial distribution, or a Bernoulli distribution.

11. A method comprising:
accessing an image obtained by a camera at a facility;
determining a plurality of features of the image using a feature detection algorithm;
determining a local descriptor value for at least a subset of the plurality of features, each of the local descriptor values indicative of a feature as viewed from a particular camera pose;

accessing object data comprising:
- a plurality of object identifiers, each of the plurality of object identifiers indicative of a particular three-dimensional (3D) object, and
- a plurality of distribution identifiers associated with the each of the plurality of object identifiers, each of the plurality of distribution identifiers indicative of a type of probability distribution descriptive of a plurality of local descriptor values that are associated with a feature of the particular 3D object;

determining a plurality of probability values for the at least a subset of the plurality of features using the object data and the local descriptor values; and comparing the plurality of probability values with the object data to identify an object in the image.

12. The method of claim 11, the comparing the plurality of probability values comprising:
- determining a set of top k distribution identifiers sorted in descending order of the plurality of probability values, wherein k is a nonzero integer value;
- determining a set of object identifiers associated with the set of top k distribution identifiers; and
- determining an object identifier having a greatest frequency of occurrence in the set of object identifiers associated with the set of top k distribution identifiers.

13. The method of claim 11, wherein the each of the local descriptor values is indicative of a value of a gradient in a virtual image of the particular 3D object given the particular camera pose.

14. A method comprising:
- accessing a plurality of images of a 3D object, wherein the plurality of images are obtained from different camera poses of a camera relative to the 3D object;
- determining a plurality of features in the plurality of images using a feature detection algorithm;
- determining, from at least a portion of the plurality of images, a same feature appears in the at least a portion of the plurality of images;
- for each image in the at least a portion of the plurality of images, determining a local descriptor value for the same feature;
- determining a probability distribution and one or more distribution parameters that fits a plurality of the local descriptor values of the same feature; and
- storing as object data:
  - an object identifier indicative of the 3D object,
  - a feature identifier indicative of a particular one of the plurality of features of the 3D object,
  - data indicative of the probability distribution associated with the feature identifier, and
  - data indicative of the one or more distribution parameters of the probability distribution associated with the feature identifier.

15. The method of claim 14, further comprising:
- determining a 3D model of the 3D object based the plurality of images;
- determining, based at least in part on the 3D model, a determined camera pose of one or more of the at least a portion of the plurality of images; and
- wherein the determining the same feature that appears in the at least a portion of the plurality of images is based at least in part on the determined camera pose.

16. The method of claim 14, wherein the determining the local descriptor value for the same feature uses one or more of: a scale-invariant feature transform (SIFT) algorithm, a gradient location and orientation histogram (GLOH), a speeded up robust features (SURF) algorithm, or a histogram of gradients (HOG) algorithm.

17. The method of claim 14, wherein the feature detection algorithm includes one or more of: a maximally stable extremal regions (MSER) algorithm, a Harris affine region algorithm, an oriented FAST and rotated BRIEF (ORB) algorithm, a DAISY algorithm, a difference of Gaussian blob detector algorithm, a Laplacian of Gaussian blob detector algorithm, or a determinant of Hessian blob algorithm.

18. The method of claim 14, wherein the feature detection algorithm and the determining the local descriptor value use at least a portion of a same algorithm.

19. The method of claim 14, wherein the probability distribution is a discrete probability distribution.

20. The method of claim 14, wherein the probability distribution is a continuous probability distribution.

21. A method comprising:
- accessing a plurality of images of an object;
- determining a plurality of features in the plurality of images;
- determining a 3D model of the object;
- determining one or more similar features that appear in at least a portion of the plurality of images;
- determining a plurality of local descriptor values of each of the plurality of features in the plurality of images;
- determining a probability distribution that fits the plurality of local descriptor values; and
- storing object data identifying the plurality of features and the probability distribution.

* * * * *

UNITED STATES PATENT AND TRADEMARK OFFICE
CERTIFICATE OF CORRECTION

PATENT NO. : 10,339,411 B1  
APPLICATION NO. : 14/868205  
DATED : July 2, 2019  
INVENTOR(S) : Gang Hua et al.

Page 1 of 1

It is certified that error appears in the above-identified patent and that said Letters Patent is hereby corrected as shown below:

On the Title Page

Item (72):  
Reads "Inventors: Gang Hua, Sammamish, WA (US);  
          Li Guan, Bellevue, WA (US)"  
When it should read -- Inventors: Gang Hua, Sammamish, WA (US)  
                       Li Guan, Bellevue, WA (US)  
                       Dilip Kumar, Seattle, WA (US)  
                       Gerard Guy Medioni, Seattle, WA (US) --

In the Claims

Claim 15 Column 30, Line 7:  
Reads "determining a 3D model of the 3D object based the"  
When it should read -- determining a 3D model of the 3D object based on the --

Signed and Sealed this  
First Day of October, 2019

Andrei Iancu  
*Director of the United States Patent and Trademark Office*